FIP8102 XR 3,571,760

United Stat

[11] 3,571,760

[72] Inventors Edmu.
Fair Lawn, N.J.;
Philip Basse, Freeport, N.Y.
[21] Appl. No. 758,875
[22] Filed Sept. 10, 1968
[45] Patented Mar. 23, 1971
[73] Assignee Slant Fin Corporation

[54] DIRECT READING DISPLAYS FOR INDICATING FREQUENCY SHIFT OF A MODULATABLE CARRIER OSCILLATOR

10 Claims, 9 Drawing Figs.

[52] U.S. Cl. .......... 332/20, 324/79, 325/133, 332/22
[51] Int. Cl. .......... H03c 3/00, G01r 23/10
[50] Field of Search .......... 332/1, 20, 22, 16; 325/31, 67, 133; 340/248; 324/79 ences Cited
UNITED STATES PATENTS

| | | | |
|---|---|---|---|
| 2,862,185 | 11/1958 | .......... | 332/1 |
| 3,071,726 | 1/1963 | Nelson .......... | 332/20X |
| 3,245,005 | 4/1966 | Garfield .......... | 332/20 |
| 3,412,388 | 11/1968 | Barton et al. .......... | 340/248(P) |

*Primary Examiner*—Alfred L. Brody
*Attorney*—Plevy and Spivak

ABSTRACT: A frequency deviation monitor utilizes a reversible or up-down counter for determining the amount of frequency shift of a carrier oscillator signal. A modulating signal is peak detected and thence applied to the carrier oscillator to shift the output frequency. This shifted frequency is used to count down a reversible counter having the unshifted frequency stored therein. The difference between the counts during a predetermined time interval is determinative of the frequency deviation.

3571760
OR IN 332/

INVENTORS
EDMUND I. SCHWARTZ &
PHILIP BASSE

INVENTORS
EDMUND I. SCHWARTZ
& PHILIP BASSE

DIRECT READING DISPLAYS FOR INDICATING FREQUENCY SHIFT OF A MODULATABLE CARRIER OSCILLATOR

This invention relates to frequency deviation monitors and more particularly to a frequency deviation meter utilizing digital techniques.

Frequency modulation of carrier waveshapes has been in widespread use as a means for conveying intelligence. Many authorities have written about the subject and numerous references exist in the prior art showing all types of systems for conveying information by frequency modulation. For example, see paper entitled "Frequency Modulation" by Wil Everitt in the Transactions of the A.I.E.E., Nov. 1940, Volume 50, page 613.

Essentially, a frequency modulated system involves varying the instantaneous frequency of a carrier or continuous frequency radio wave while maintaining the amplitude of the radio wave constant. The number of times per second that the instantaneous frequency is varied about the average or carrier frequency is the modulating frequency, while the amount that the instantaneous frequency varies away from the average is designated as the frequency deviation and is, as such, proportional to the amplitude of the modulating signal.

It can be shown, mathematically, that a fundamental characteristic of a frequency modulated wave is that the frequency deviation as defined above, is proportional to the peak amplitude of the modulating signal and in pure frequency modulation is independent of the modulating frequency. Such a frequency modulated signal can be expressed in terms of the equation: $e=A \sin (w_c t+m_f \operatorname{Sin} w_m t)$ (1)
where $e$=instantaneous amplitude of the wave A=peak amplitude $wc$=angular velocity of the unmodulated carrier wave=average angular velocity in radians/sec.

$w_m$=angular velocity of the modulating frequency in radians per second.

$m_f$=modulation index of the frequency modulated wave.

The modulation index $m_f$ is further defined as:

$$m_f=\frac{\Delta f}{f_m}=\frac{\text{frequency deviation}}{\text{modulating frequency}} \quad (2)$$

From equation (2) it follows that for a given frequency deviation, the modulation index $m_f$ varies inversely as the modulating frequency. Conversely for a given modulation index the modulating frequency varies in direct proportion to the frequency deviation.

Equation (1) might indicate that intelligence could be transmitted by frequency modulation in a very narrow bandwidth. This is not so; as variations in the instantaneous frequency result in nonsinusoidal waveshapes of individual cycles and hence frequency modulated waves contain a plurality of distorted or nonsinusoidal oscillations.

By analysis it can be shown that the distorted oscillations corresponding to a waveshape with a sinusoidal frequency modulation is made up of frequency components spaced by the modulating frequency and whose amplitudes depend upon the modulating index $m_f$ and the sideband order. Such amplitudes can be calculated with the aid of a table of Bessel's function or from a suitable graph as plotting modulation index $m_f$ verses relative amplitudes of the unmodulated carriers.

Generally speaking a frequency modulated wave contains sidebands on either side of the carrier wave over a frequency interval approximating the frequency deviation. The bandwidth of the wave is then twice this value. The frequencies within the band will be spaced at intervals equal to the modulating frequency (i.e. closer for lower modulating frequencies). As the modulation index $m_f$ becomes great when compared to unity the bandwidth occupied by the sidebands will be approximately twice the frequency deviation and will be very slightly affected by the modulating frequency.

In utilizing signal generators for test purposes or for determining the overall characteristics of a system as to frequency response, and so on, it is desirable to have some indication of the frequency deviation of a frequency modulated carrier waveshape. In such devices, as signal generators, which provide carrier frequencies over a broad range, it is desirable to be able to frequency modulate such carriers within known limits of frequency deviation. Such signal generators generally contain source of audio frequency operating either at 400 Hz. or 1000 Hz., whose frequency is generally much lower than that of the carrier waves generated by the signal generator. For such low frequencies with high values of modulating indexes $m_f$ (i.e. greater than one) the frequency deviation is approximately equal to twice the highest energy content sideband. Therefore in certain applications it is practical to determine the sideband displaced from the carrier by an integral multiple of the modulating frequency which contains the greatest amount of energy. This sideband is approximately at a frequency equal to the frequency deviation. The total deviation for relatively symmetrical modulation is twice this value. In any case, the above approximation is applicable for higher modulating frequencies with high modulation indexes.

Prior art techniques for measuring frequency deviations utilize mixing circuits and stable oscillators to derive beat frequencies which may in turn, again be mixed with a reference oscillator to provide a lower signal. This signal is impressed upon a meter and one of the oscillators is adjusted until the indicating meter reads zero or a predetermined value. The setting of the adjusted oscillator as compared to its original setting can be used to obtain frequency deviation. Still other techniques employ oscilloscope displays where frequency deviation may be read by counting the number of cycles on the display or by viewing a calibrated graticule associated with the display. Still other techniques use complicated and carefully adjusted circuits for selecting the frequency bands required for observation and for providing suitable indications of the instantaneous frequency values of the signals.

It is therefore an object of the present invention to provide improved circuitry for determining frequency deviation within acceptable tolerances.

A further object of this invention is to provide an improved signal generator having circuit means for determining frequency deviation.

A further object is to provide an improved digital device for providing a simple indication of frequency deviation of a frequency modulated carrier waveshape.

These and other objects of the present invention are accomplished in one embodiment thereof by providing a carrier wave oscillator, as that contained in a wideband signal generator, whose output frequency is to be modulated. The output frequency of the unmodulated carrier waveshape is stored in a digital counting means. The modulating waveshape which is to be used to modulate the carrier waveshape is automatically applied to the input of a peak detector circuit. The output of the peak detector is applied to the carrier wave oscillator. The DC output of the detector causes the oscillator's frequency to change in response to the peaks of the modulating frequency. This changed frequency is applied to a second indicator means as a counter, which stores the changed frequency value at the end of this predetermined storage mode. The two counters or indicating means are automatically caused to reverse count or count towards zero simultaneously. As soon as one counter reaches the all zero state, the all zero condition is sensed, and the countdown is terminated. The counter which did not reach the zero state now contains a reading corresponding to the frequency deviation.

A further embodiment described herein utilizes a single counter as an up-down counter whose reading at the end of the above-described modes gives the frequency deviation directly.

For a clearer understanding of the present invention together with other objects reference is made to the following specification and drawings in which.

Figure 2:
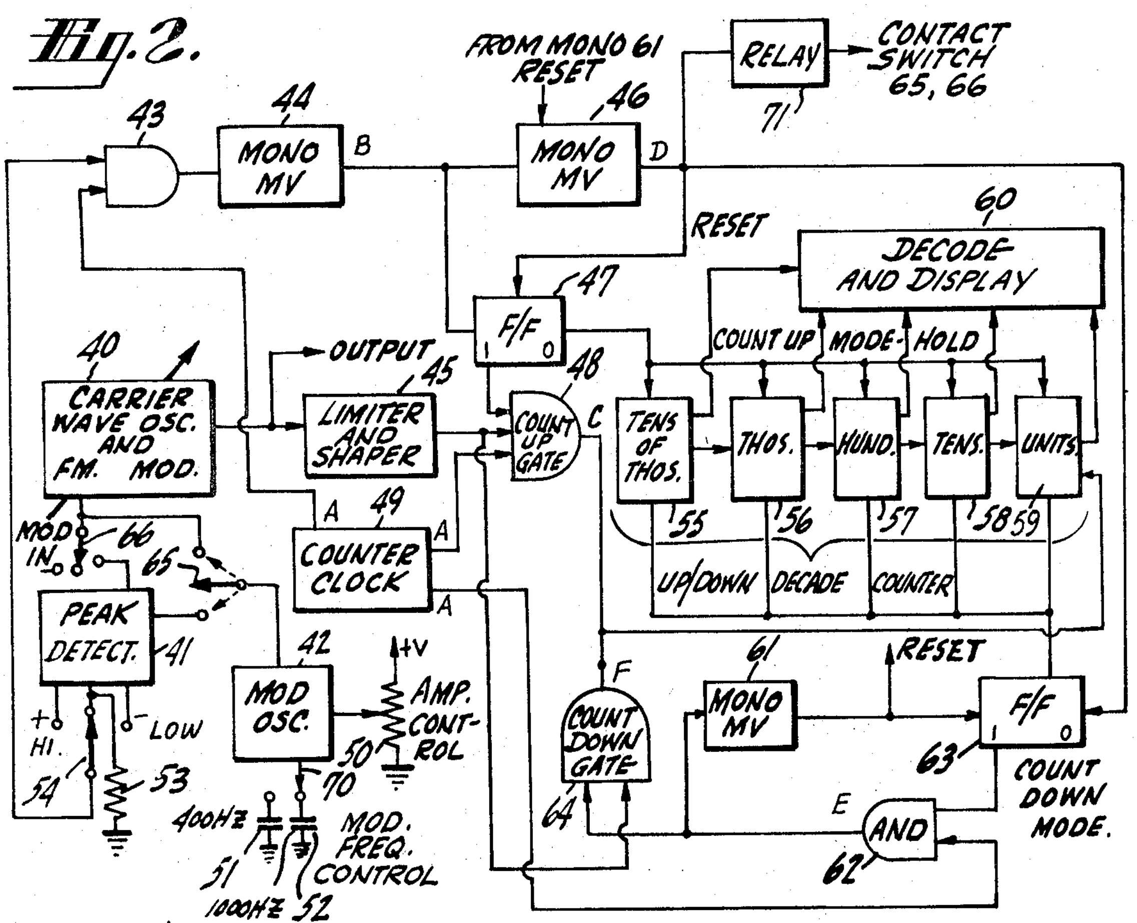
FIG. 2 is a schematic diagram of another embodiment of a deviation monitor according to this invention.

FIGS. 3A to F are timing waveshapes useful in explaining the operation of FIG. 2.

Figure 1:
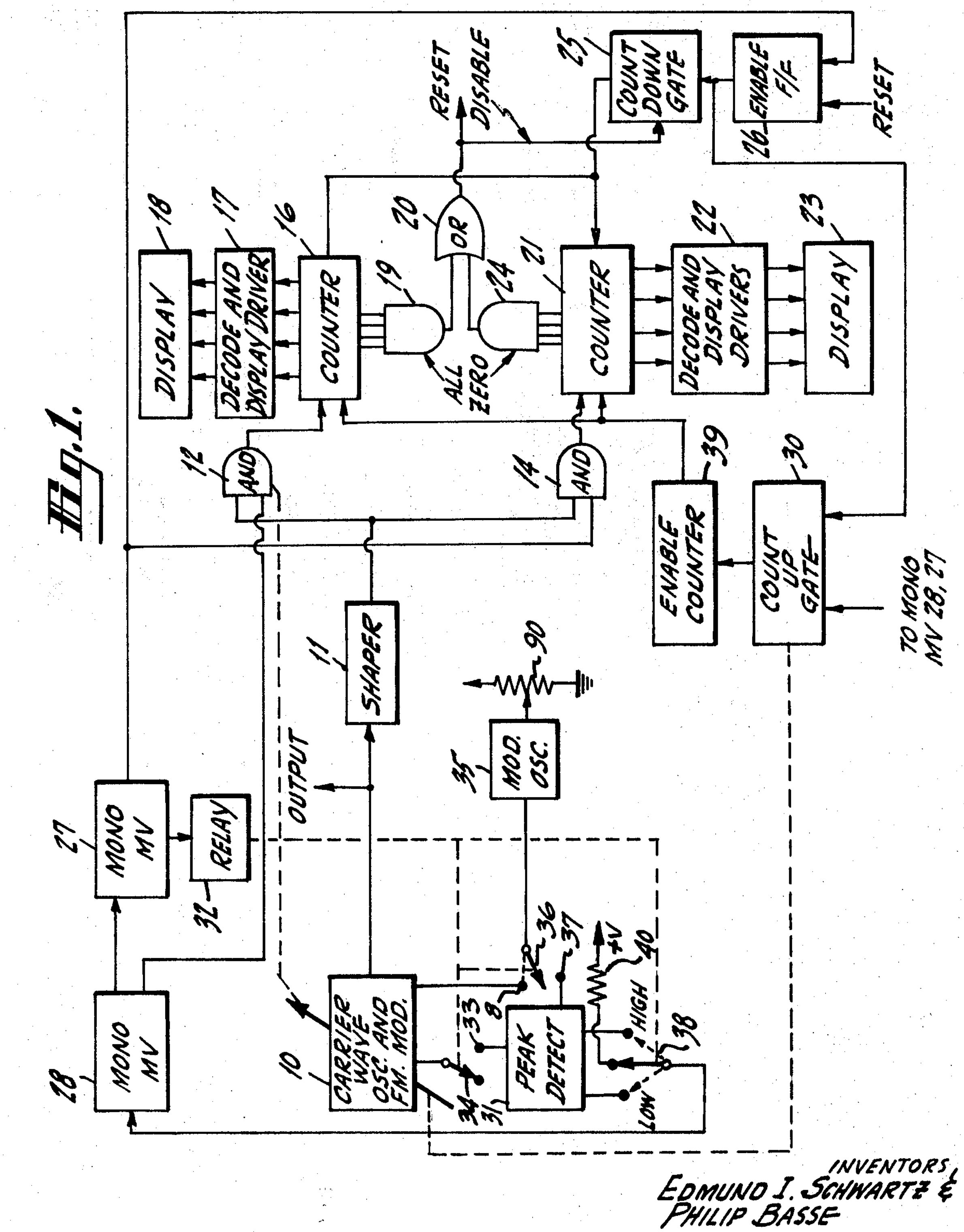
FIG. 1 is a schematic diagram in block form of a frequency deviation monitor in accordance with this invention.

Referring to FIG. 1 there is shown a carrier wave oscillator 10. Oscillator 10 may be a wideband oscillator, such as those employed in signal generators and as such is capable of being continuously tuned over a wide range of frequencies. The carrier wave oscillator 10, likewise, may be the carrier wave oscillator of a frequency modulated transmitter and so on. For the purposes of this specification the system and circuits herein described will refer to a frequency deviation system in reference to the environment of a signal generator. It is understood that other uses of the apparatus and invention described herein are contemplated.

The output of carrier oscillator 10 can be used directly for frequency measurements and so on, while an output is coupled to a shaper circuit 11. Shaper circuit 11 functions to limit and shape the sinusoidal oscillations from oscillator 10 into a pulse train or square wave, whose positive and negative excursions are compatible with digital type circuitry such as gates and flip-flops, etc. The output of shaper 11 is coupled to the input of an AND gate 12 and to the input on an AND gate 14. AND gates 12 and 14 are conventional in the art and serve to provide an output for the presence of two or more enabling signals at two or more inputs. AND functions are well known and many examples of suitable gates as 12 and 14 appear in the prior art. For example, see a text entitled "Pulse and Digital Circuits" McGraw-Hill (1956) by Millman and Taub, Chapter 13 entitled "Digital Computer Circuits" pages 392 to 427. The output of AND gate 12 feeds a digital decade counter 16. Counter 16 may be a suitable chain of binary stages or flip-flops wired and arranged to provide a binary count for each pulse coupled to the input thereof. Each module of the counter 16 is responsive to 10 pulses to provide 10 states, at the end of which the cycle begins again. In this manner by coupling decade stages together one can count decimally or conventionally. Specifically, counter 16 contains suitable coupling gates and so, and functions to count pulses coupled via the output of AND gate 12. The outputs from the flip-flops included in counter 16 are coupled to a suitable decode matrix 17 or further gates, each of which are responsive to one of the various counting states of counter 16 and are included within rectangle 17. The outputs of the decode matrix 17 serves to therefore convert the binary status of counter 16 to a decimal indication and may be coupled to suitable transistor drive amplifiers for driving a display 18, such as lamps or indicator tubes, which provides a decimal readout of the binary state of the counter 16 as decoded by the gates in module 17. The counter 16 via the decode gates and so on, would provide a display which would indicate for example, 100, for 100 pulses at the output of AND gate 12. For the purposes of this invention counter 16 is specifically an up-down decade counter. Such a counter will count upwards for the activation of one input and backwards or down for the activation or application of pulses to another input. For examples of such suitable circuits and stage configurations for a decade counter of any length see a text entitled "Application Report" Bulletin CA-102, by Texas Instruments (1968) pages 20 to 21, Chapter VII entitled "Synchronous Binary Counters and Shift Counters". See also an article entitled "Bidirectional Counting", Part I by D. Fleming in EDN, Volume 12, No. 3, Feb. 1967, pages 36—39, Part II EDN, Volume 12, No. 4, pages 46—49. For example the circuit shown on page 23 of the "Application Report" cited above would form a suitable decade module useful for implementing counter 16.

A further AND gate 19 is used to determine the all zero count or state of the decade counter 16 and is suitably coupled to the counting stages or modules included within counter 16. The output of gate 19 is coupled to the input of OR gate 20, which serves to provide an output when either input thereof is activated.

In a similar manner the output of AND gate 14 is coupled to a decade counter 21, which is the same type of counter as described in conjunction with counter 16. Counter 21 is also coupled to suitable decode matrix and display driver modules 22 and has a display 23 associated therewith. The function and operation of decode and display driver 22, and display 23 are the same as modules 17 and 18 associated with counter 16.

An AND gate 24 is coupled to the counter 21 to decode the all zero state thereof and has its output coupled to another input of OR gate 20. The output of OR gate 20 is coupled to a disable output of a module 25 entitled count-down gate 25. The function of gate 25 is to enable the count down lead associated with counters 16 and 21. An enable circuit 26, which may be an ordinary flip-flop or inverting gate has its output coupled to an input of count-down gate 25 for activating gate 25 as will be described. The enable gate 26 is under control of a monostable multivibrator 27, which has its input under control of another monostable multivibrator 28. Monostable 28 further has suitable outputs coupled to another input of AND gates 12 and 14 respectively, for controlling the operation of those gates.

A further gate 30 entitled count-up gate serves together with the enable counter circuit 39 to activate counters 16 and 21 in a manner to cause them to count in the conventional or "up" state.

Also shown in FIG. 1 is a peak detector 31 having an output. The output 33 can be selectively coupled to the carrier oscillator 10 by means of the switch 34, shown in a noncoupling position, dashed lines show how switch 34 serves to couple the output of peak detector 31 to the carrier wave oscillator 10.

A modulating oscillator 35 has an output coupled to a switch 36. Potentiometer 90 serves as an amplitude control to adjust the output level of the signal obtained from the modulating oscillator 35. Switch 36 has a contact 37 coupled to the input of the peak detector 31 and a contact 8 coupled to the carrier wave oscillator 10. In this manner switch 36 can couple the output of the modulating oscillator 35 to either the peak detector 31 or the oscillator 10.

A further switch 38 is coupled to the peak detector 31, and serves to select the peak responsive mode of the detector 31 as Low or High as will be explained further on. The switch 38 is shown in a nonactive position which position serves to couple resistor 40 to the input of the monostable 28. One terminal of resistor 40 is coupled to a bias supply designated for reference purposes only, as +V.

The circuit operation together with a particular descriptive material, where applicable, of the individual modules referenced to FIG. 1 will now be given.

Carrier wave oscillator 10, as indicated above, may be included in a wideband signal generator apparatus, and as such has a provision and circuitry included therein for frequency modulating the output thereof. Frequency modulation of an oscillator may be accomplished by shunting the oscillator 10 by a reactance tube or transistor circuit, whose reactance varies as a function of the modulating voltage. Such circuits may utilize semiconductor devices as varactor diodes, whereby the reactance of the device across suitable terminals thereof, varies as a function of a bias voltage impressed upon the device. Such circuits and techniques for frequency modulating an oscillator 10 are well known. See for example a text entitled "Electronic and Radio Engineering" by F. E. Terman, McGraw-Hill (1955), pages 600 to 605. Accordingly, included within rectangle 10 is a suitable circuit coupled across the oscillator configuration for varying or frequency modulating the output thereof.

The signal generator contains a modulating oscillator 35. This oscillator 35 may be a Hartley, Colpitts or phase shift type oscillator and operates at a lower frequency than the lowest frequency of the carrier wave oscillator 10. For example carrier oscillator 10, may be tuneable over a range of 100 kHz. to 10 MHz. while oscillator 35 is designed to provide a frequency of 1000 Hz. and 400 Hz. or be tuneable between the limits of 400 to 1000 Hz. The output of oscillator 35 is therefore a low frequency sinusoidal waveshape and is used to frequency modulate oscillator 10 by causing switch 36 to be placed in the dashed position shown; thereby coupling modulating oscillator 35 to the suitable reactance circuit included as part of oscillator 10. If this were done, the oscillator 10 would have a frequency modulated output where the instantaneous frequency of the carrier wave would be changing with the sinusoidal output of oscillator 35. As such the output of oscillator 10 would have a changing center frequency which could not be accurately displayed on a conventional counter.

In many applications, while it is desirable to know the modulating frequency (i.e. that frequency of oscillator 35), it is also desireable to know the frequency deviation. If these were known than the modulation index $m_f$ is easily calculated by use of equation (2). As indicated previously the frequency deviation is proportional to the peak amplitude of the modulating signal, and is relatively independent of the modulating frequency.

In order to determine frequency deviation by the use of the circuit of FIG. 1 or a close approximation thereof, the following operations occur. First the operator selects the desired carrier wave by tuning oscillator 10 to the desired frequency.

The dashed lines show a coupling between AND gate 12 and the count-up gate 30 with the variable tuning mechanism indicated by the arrow, associated with oscillator 10. This coupling as shown, is to indicate that when the operator tunes to the desired carrier frequency, counter 16 may be activated and used as a indicating means. In this manner the count-up gate 30 would provide an accurate gating pulse derived from a crystal oscillator or so on, included in rectangle 30, having a duration of say 1 cycle per second. Therefore the counter 16 will count all transitions made by oscillator 10 in 1 second and the display will then read frequency directly. As soon as the desired frequency is reached the tuning adjustment is released, this action disengages the tuning mechanism so that the center or carrier frequency of oscillator 10 cannot be changed. The counter 16 is now reset and the count-up gate 30 is inactivated.

The operator now manually places switch 38 into the High or Low position. The High position activates the peak detector 31 to be responsive to positive peaks while the low position activates peak detector 31 to be responsive to negative peaks. Peak detectors as 31, may be a simple diode detector or rectifier circuits. Such a circuit, depending on the polarity of the diode, will respond to the positive or negative peaks of a frequency signal to produce at an output a DC potential proportional to the peak of the applied frequency signal. See "Electronic and Radio Engineering" (ibid.) Chapter 16 entitled "Detectors and Mixers". In this manner switch 38 serves to select the polarity of a diode or rectifier included in rectangle 31 causing it to behave as a positive peak detector, in the High position and a negative peak detector for example, in the Low position. When switch 38 is placed in either the High or Low position, the mechanical coupling between switch 38 and switch 36 causes the output of modulating oscillator 35 to be removed from the input to the carrier oscillator 10. For example this would be necessary if modulating oscillator 35 was previously connected to the carrier oscillator 10.

The selection of either the High or Low operating mode of peak detector 31 further triggers the monostable multivibrator 28 which, in turn, activates or enables the AND gate 12, and activates the count-up gate 30 which again provides the 1 Hz. clock signal. It is, of course, understood that the clock timing gate (1Hz.) as controlling the activation of the counters 16 and 21 may be different than 1 Hz. and still with proper reference, as prescaling techniques, mixing and so on cause counters 16 and 21 to read frequency direct.

In any case, the period that monostable 28 is activated for is somewhat longer than for, this example, the 1 Hz. count-up gate derived from gate 30. In this manner multivibrator 28 times the sequence, while the counter is activated by the accurate 1 Hz. gating pulse. The 1 Hz. gating pulse for counter 16 may be a square wave having a 1 second positive and a 1 second negative level. In this manner the counter 16 is only activated during the positive level and not during the negative. The time delay of monostable 28 is greater than 1 second but less than 2 seconds, and therefore at the end of the monostable period the counter 16 has stored therein, the unmodulated frequency of the carrier oscillator 10 as previously set up by the operator. At the end of the sequence or at the termination of the period of the monostable 28, the monostable multivibrator 27 is enabled by the transition pulse occurring at the end of the period of the monostable 28. This enable level now enables AND gate 14 and simultaneously connects the output of the modulating oscillator 35 to the input of the peak detector 31, and also connects the output of the peak detector 31 to the carrier wave oscillator 10. There are many ways of accomplishing this. The figure shows a relay 32 which is energized by monostable 27, switch 34 and 36 may be contacts or terminals on this relay and hence for the energization of the relay 32 the above operations are automatically performed. It is understood that suitable "gates" or logical elements can serve as well in lieu of relay 32. During the time duration or period of monostable 27 the following operation occurs. The peak detector 31 as connected will detect the positive or negative peaks thereof (depending upon the setting of switch 38) and provide at the detector 31 output, a DC potential indicative of the amplitudes of these peaks. This potential is applied to the reactance circuit of oscillator 10 and therefore serves to shift the frequency upwards or downwards depending upon the detector mode and in accordance with the detected DC level. The output from the carrier wave oscillator 10 is now changed in frequency according to the peak value of the detected modulating waveshape. This frequency therefore corresponds to the frequency deviation that the modulating signal imparts to the carrier signal. In this mode, the AND gate 14 gates the pulses representative of this shifted carrier frequency into counter 21, whose timing is again controlled by the count-up gate 30 and enable counter 39. The period of the monostable 27 is chosen as that of monostable 28. At the end of this period counter 21, contains a count indicative of the shifted frequency. If one were to stop the sequence at this point, counter 16 would contain the unmodulated carrier frequency, and counter 21 would contain the shifted frequency as determined by the peak of the modulating frequency. The arithmetic difference between the number displayed from counter 16 with that of counter 21 would be equal to one-half of the frequency deviation. At the termination of the period of monostable 27, AND gate 14 is again disabled and counter 21 holds the count pertaining to the shifted frequency. The modulation oscillator 35 and peak detector 33 are switched back to normal positions and the enable flip-flop 26 is triggered. The triggering of flip-flop 26 causes the "count-up" gate to be inactivated and hence disables the count-up modes of counters 16 and 21. A count-down gate 25 which may be a free running multivibrator is enabled by flip-flop 26 as is the count-down circuitry of counters 16 and 21. In this manner the counters 16 and 21 are synchronously stepped down or caused to count backwards. That is each pulse generated by the count-down gate 25 causes a reduction by one in the number representing frequency as appearing on the displays 18 and 23 associated respectively with counters 16 and 21.

As soon as one counter 16 or 21 reaches the all zero count, the OR gate 20 is activated by either AND gate 19 or 24. Activation of OR gate 20 stops the count-down gate 25 and resets flip-flop 26. At this time one counter reads all zero, while the other counter 16 or 21 reads the peak frequency deviation directly.

It is of course, understood that the sequence of events occurs rapidly because of the speed of the logic elements and that the 1 Hz clock used to cause counters 16 and 21 to read frequency directly can be substituted by a faster clock and a suitable factor built into the counters 16 and 21 to cause direct frequency reading therefrom in a much shorter interval.

The operator in a similar manner can now reset the peak amplitude of the signal of modulating oscillator 35, to that desired to obtain the frequency deviation required by again performing the above described operations. Even though one might multiply the reading of the counter by two to obtain the total deviation on both sides of the carrier signal frequency; the equipment, by detecting either negative or positive peaks will do this automatically. This aspect is important as oscillator and reactance circuits will not necessarily be linearly modulated by the same amount for equal magnitude positive and negative voltages applied to reactance devices associated therewith. For example a 5 volt positive signal from positive peak detector operation might shift the frequency of a 1,000,000 Hz. carrier wave from oscillator to 10 by 20,000 Hz., while a negative signal from negative peak detector operation might shift the same carrier only 15,000 Hz. in the opposite direction. Hence a truer estimation of frequency deviation as 35,000 Hz. is available instead of a 40,000 Hz. or 30,000 Hz. depending upon the test performed.

After the operator receives the displayed indication of frequency deviation, switch 36 would be manually placed in the position connecting the modulating oscillator 35 to the carrier wave oscillator 10, and the characteristics of the FM signal emanating from oscillator 10 would be known.

If reference is made to FIG. 2 there is shown a frequency deviation monitor circuit utilizing a single up-down decade counter.

For the purposes of this explanation of operation, assume that the output frequency of the carrier oscillator 40 is set at 90,000 Hz. and that the operator desires to frequency modulate the carrier with a 1,000 Hz. signal from modulating oscillator 42. FIG. 2 therefore shows switch 70 labeled Mod. frequency control connected to capacitor 52 to set oscillator 42 at 1,000 Hz. The amplitude control 50 associated with the oscillator 42 serves to control the amplitude or peak voltage variations of oscillator 42 and is set at some particular value.

Now the operator desires to determine the amount of frequency deviation which will be provided by impressing the sinusoidal signal output of oscillator 42 upon the frequency modulation apparatus associated with carrier oscillator 40.

Figure 3:
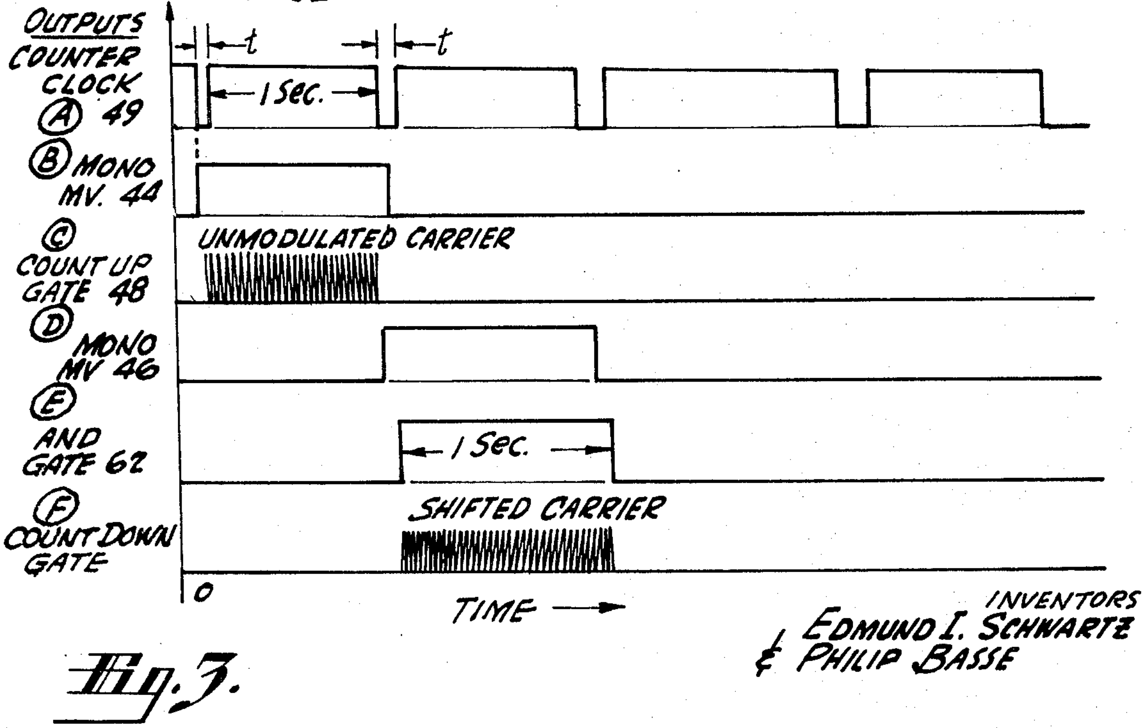

As previously described in conjunction with FIG. 1, the switch 54 is moved by the operator into the high or low positions. Assume the switch 54 as selected by the operator is placed in the High position causing the peak detector 41 to be biased in a direction to be responsive to positive peaks. As switch 54 is moved resistor 53 is removed from the input to AND gate 43, thus enabling one input thereof. The other input of AND gate 43 is derived from the counter clock 49, whose circuitry produces a waveshape at its output as shown in FIG. 3A. The clock waveshape has an accurate positive period equal to 1 second and derived from a calibrated and regulated crystal oscillator source included in rectangle 49. AND gate 43 provides an output when the negative transition of duration, *t*, appears at the input of gate 43 coupled to the clock 49. This transition triggers the monostable 44, whose period is selected to be of a duration of one second plus a fraction of the time *t*. In this manner the output of monostable multivibrator 44 as shown in FIG. 3B, always includes or overlaps the 1 second positive clock interval. The triggering of monostable 44 causes the output positive transition, to trigger flip-flop 47, whose trigger input is connected to monostable 44. The transition or change of stage of flip-flop 47 enables the count-up gate 48 and simultaneously selects the mode of the up-down decade counter, comprising individual decade stages 55, 56, 57, 58 and 59, to operate in the count-up mode.

The count-up gate 48 has three inputs. One input is controlled by the output of flip-flop 47 and is enabled, another input is coupled to an output of the limiter and shaper 45. The limiter and shaper 45 has the input coupled to the carrier oscillator 40 and is receiving the unmodulated 90,000 Hz. signal as selected by the operator. The limiter and shaper 45 serves to convert the sinusoidal oscillations of carrier wave oscillator 40 to pulse train or square wave having excursions compatible with the digital circuitry employed herein. Another input to gate 48 is from the clock 49. Gate 48 will then pass carrier wave shaped pulses for the duration of the positive 1 second level of the clock waveshape. The output of gate 48, FIG. 3C, then contains 90,000 pulses in 1 second, which are gated and counted by the decade counter comprising stages 55 and 59. At the end of the 1 second clock period monostable multivibrator 46 is triggered by the negative transition of monostable 44 (FIG. 3D). The decade counter stages operating in the count-up mode reached the count of 90,000 which is displayed and stored in the counter and associated decode and display circuitry 60.

Triggering of monostable 46 resets flip-flop 47 and activates relay 71. Relay 71 has contacts thereon which are represented by switch 65 and switch 66. The activation of relay 71 causes the output of modulating oscillator 42 to be connected to the input of peak detector 41 and the output of peak detector 41 to be connected to the input to carrier wave oscillator 40. This sequence occurs during the time allotted within period *t* after the recovery of multivibrator 44. The peak detector 41, responds to the positive peak amplitude of modulating oscillator 42 output and produces a DC proportional thereto at the input to the carrier oscillator 40. This DC, in turn, as coupled to the FM modulator associated with oscillator 40 shifts the frequency according to the detected peak value or the DC output of detector 41 and hence to a frequency representative of the peak deviated frequency.

The output of monostable 46, i.e., the positive transition triggers flip-flop 63, which primes the decade counter stages 55 and 59 for the count-down mode, and simultaneously flip-flop 63 enables one input of AND gate 62, shown for clearly describing the process involved. In practice AND gate 62 as functioning can be combined with the count-down gate 64.

AND gate 62 has the other input coupled to the clock 49. The output of AND gate 62 will follow the positive clock excursions as shown in FIG. 3F. The output of 62 is coupled to an input of count-down gate 64. The other input of the count-down gate 64. The other input to the count-down gate 64 is from the output or limiter and shaper 45 whose output now provides the frequency shifted carrier wave signal. This shifted signal is applied to the decade counter which is primed in the count-down mode, and causes the counter to count down from 90,000 Hz., which is the count previously stored therein. For purposes of this example, assume that the shifted frequency due to the DC applied to the carrier oscillator 40 via peak detector 41 is 80,650 Hz. At the end of the 1 second clock interval monostable 61, would reset the flip-flop 63 and terminate the entire cycle. Hence in 1 second gate 64 would pass 80,650 pulses and decade counting stages 55 to 59 would be at a count equal to the difference between 90,000 and 80,650 Hz., which would correspond to the frequency deviation due to the peak amplitude of the 1,000 Hz. signal from oscillator 42.

Assume now that the frequency of oscillator 40 was shifted upwards say to 99,350 Hz. In the count-down mode, when the decade counter reaches the zero state it will behave as a count-up counter for the remaining pulses and therefore would again read 90,350 Hz, or the high frequency deviation. This mode of operation can be seen by truth tables defining up-down counter operation, and as shown in the above cited application note, Bulletin CA–102 on page 23.

Many other techniques employing the concepts of this invention will be apparent to one skilled in the art. For example, the 1 second clock rate as conveniently used herein to cause the counting stages described to read frequency directly may be lowered and the output frequency of the carrier oscillator divided accordingly or premixed to obtain a lower frequency. It is noted that in lieu of relays ordinary transistor or diode gates could be used to perform switching or signal coupling as is known in the art. It is further anticipated that other timing schemes eliminating monostable multivibrators can be utilized by appropriate operations as gating or utilizing digital frequency synthesis techniques to develop more accurate timing waveshapes directly from a stable crystal source.

The scope and breadth of this invention is therefore to be limited solely by the appended claims.

We claim:

1. Apparatus for monitoring the amount of frequency deviation of a carrier oscillator signal, said carrier oscillator including a modulator for shifting the frequency of said carrier oscillator signal in accordance with a modulating signal which may be selectively applied to said modulator, the combination therewith comprising:

a. a reversible counter;

b. means for applying the unmodulated carrier signal to said counter for a predetermined period for operating said counter in a first direction to register a count in said counter at the end of said predetermined period which manifests the number of cycles of said unmodulated carrier signal which have occurred during said period;

c. a peak detector for providing a DC output proportional to the peak amplitude of a modulating signal applied to an input thereof;

d. a source of modulating signals; and e. means for selectively coupling said source to said input of said peak detector and said peak detector output to said modulator for shifting said carrier signal an amount proportional to said DC output of said detector, said means including time delay means for applying said shifted carrier signal to said counter for said predetermined period for operating said counter in a second direction to register a count in said counter at the end of said predetermined period which manifests the number of cycles of the difference between said shifted and said unmodulated carrier frequencies.

2. The apparatus according to claim 1 wherein said peak detector is of the type whose polarity may be selectively changed to provide a DC output responsive to positive peaks of a sinusoidal modulating signal for one polarity, and negative peaks of said modulating signal for a second selected polarity.

3. The apparatus according to claim 1 wherein said reversible counter comprises a plurality of decade stages individually connected to function as a multistage decade counter.

4. The apparatus according to claim 1 further comprising:

a. indicating means coupled to said counter for providing a visual display of a count registered in said counter.

5. Apparatus for monitoring the amount of frequency deviation of a carrier oscillator signal, said carrier oscillator including a selectively operated modulator coupled thereto for shifting the frequency of said carrier signal in accordance with the peak amplitude of a modulating signal applied to said modulator when said modulator is coupled to said oscillator, the combination therewith comprising:

a. counting means coupled to said carrier oscillator and which when operated in its forward direction is capable of counting the number of cycles of said frequency signal which occur in a predetermined time interval, said counter when operated in its reverse direction counts the number of cycles of said signal of said oscillator in said predetermined time interval in said reverse direction;

b. a detector having an input and output terminal, said detector operative to provide at said output a DC level proportional to the peak amplitude of a sinusoidal frequency signal applied to said input;

c. means coupled to said counting means for operating said counting means in said forward direction to count said oscillator frequency in said forward direction during said predetermined interval;

d. means responsive to the termination of said predetermined interval for coupling said peak detector to said carrier oscillator and for applying said modulating signal to said input of said detector, to shift said oscillator frequency as determined by said forward direction count, said means including time delay means responsive to said shift for operating said counting means in said reverse direction to count said shifted frequency in said reverse direction during said predetermined interval, whereby at the termination of said interval said counter has a count therein manifesting the difference between said oscillator frequency and said shifted oscillator frequency.

6. The apparatus according to claim 5 wherein said time delay means comprises a monostable multivibrator.

7. Apparatus for maintaining the amount of frequency deviation of a carrier oscillator signal, said carrier oscillator including a modulator for varying said frequency of said signal in accordance with the amplitude of a sinusoidal modulating signal to be selectively applied thereto, the combination therewith comprising:

a. a up-down storage counter coupled to said oscillator and operative in said first mode to count and store a numerical indication of said oscillator frequency directly in a forward count sequence and in a second mode to count and store a numerical designation of said frequency in a reverse count sequence;

b. a detector having an output and an input, said detector operative to provide a DC level at said output indicative of the peak amplitude of a sinusoidal frequency signal applied to said input;

c. first means for activating said counter in said first mode whereby said carrier frequency of said carrier oscillator is counted directly;

d. second means for selectively coupling said output of said detector to said modulator after said carrier frequency is counted and for applying said sinusoidal modulating signal to said input of said detector, to cause said DC level at said detector output as applied to said modulator to shift said carrier frequency of said oscillator according to said peak amplitude of said modulating signal;

e. third means responsive to said second means completing said selective coupling for operating said counter in said second mode responsive to said shifted carrier frequency to cause said counter to count said shifted frequency in a reverse sequence starting from said last count indicative of said carrier frequency, f. means coupled to said counter for displaying said reverse sequence count after an interval substantially equal to that interval required to count said carrier frequency in said first mode.

8. Apparatus for monitoring the amount of frequency deviation of a carrier oscillator signal, said carrier oscillator including means for modulating the frequency of said signal in accordance with the magnitude of a modulating signal selectively applied to said means comprising:

a. timing means including a frequency counting circuit coupled to said carrier oscillator and operative in a first mode responsive to said carrier oscillator signal for providing a numerical designation of the frequency of said carrier signal, said counting circuit operative in said first mode to store said numerical designation at the end of a period generated by said timing means and operative in a second selectable mode to count said frequency of said oscillator in a reverse direction starting with said stored numerical designation and counting towards a zero indication, said second mode being controlled by said timing means;

b. first means for providing a DC output signal of a level proportional to said magnitude of said modulating signal;

c. second means for selectively coupling said carrier oscillator to said first means wherein said DC output signal is applied to said means for modulating said carrier frequency to shift said frequency an amount in accordance with said DC level; and d. third means operative in response to said selection of said second means to operate said counter in said second mode to cause said counter to count in said reverse direction in response to said shifted frequency whereby said counting means has stored therein at the end of said period of said second mode the difference between said stored numerical designation as representing said carrier frequency and said numerical designation representing said shifted carrier frequency.

9. A frequency deviation monitor comprising:

a. a carrier wave oscillator capable of being selectively tuned over a frequency band, for providing a plurality of frequency signals, said oscillator including modulatable means coupled thereto for selectively frequency modulating any of said frequency signals;

b. a second oscillator for providing an output signal of a fixed frequency and amplitude;

c. a peak detector for providing at an output a DC level proportional to the peaks of a signal of a suitable frequency and amplitude applied to an input thereof;

d. first and second counters, including a timing generator, coupled to said carrier wave oscillator for providing and storing an output count representative of any one of said selected frequency signals, said first and second counters each having a second activateable mode for providing an output count in a reverse direction whereby the activation of said mode causes said counters to count down from any output count stored therein towards zero;

f. means for activating said first counter in said first mode to cause said counter to provide a first output count representative of said one frequency signal from said carrier oscillator;

g. switching means responsive to said first counter providing said output count for selectively coupling said output of said peak detector to said modulatable means included in said carrier wave oscillator, and the input of said peak detector to said output of said second oscillator to cause the DC output of said detector to shift said frequency of said carrier oscillator via said modulatable means in accordance with the magnitude of said peaks of said second oscillator signal, said switching means further activating said second counter to operate in said first mode to cause said second counter to provide a second output count representative of said shifted frequency;

h. second switching means coupled to said first and second counters and responsive to said second counter providing said second output count for activating said first and second counters in said second mode;

i. decoding means coupled to said first and second counters for determining when either of said first and second counters reached an all zero count; and j. means coupled to said decoding means and said counters responsive to said determination of said all zero count for disabling said counters, whereby said counter not at said all zero count provides at said output a count representative of the frequency shift of said carrier wave oscillator as caused by said DC output level of said peak detector.

10. A method of determining the amount of frequency deviation of modulatable carrier oscillator by a modulating frequency signal source, comprising the steps of:

a. counting and storing a number indicative of said unmodulated carrier frequency;

b. peak detecting said modulating frequency signal source to derive a DC potential proportional to said signal peaks;

c. applying said DC to said modulatable oscillator for shifting the frequency thereof;

d. counting and storing a number indicative of said shifted frequency; and e. subtracting said number indicative of said unmodulated frequency from said number indicative of said shifted frequency.